May 15, 1934.  S. E. ANGELL  1,959,147
TWIN WHEEL STRUCTURE
Filed April 9, 1931   2 Sheets-Sheet 1

Stanton E Angell
Inventor

By
Geo E Kirk
Attorney

May 15, 1934.　　　　S. E. ANGELL　　　　1,959,147
TWIN WHEEL STRUCTURE
Filed April 9, 1931　　　2 Sheets-Sheet 2

Inventor
Stanton E. Angell
By
Geo E Kirk
Attorney

Patented May 15, 1934

1,959,147

UNITED STATES PATENT OFFICE 1,959,147

TWIN WHEEL STRUCTURE

Stanton E. Angell, Toledo, Ohio

Application April 9, 1931, Serial No. 528,790

7 Claims. (Cl. 180—22)

This invention relates to traction wheels of the twin type.

This invention has utility when incorporated in truck or bus pneumatic tire equipped wheel pairs or twins, having special value for driving.

Referring to the drawings.

Figure 1:
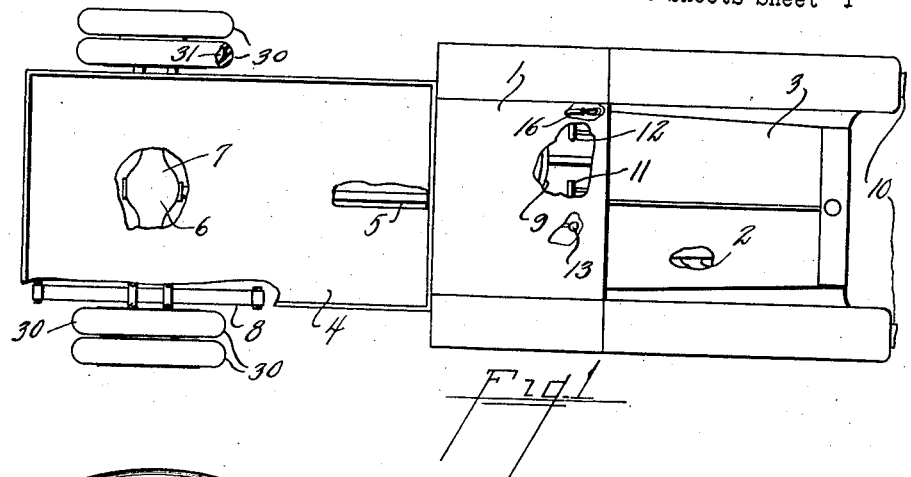
Fig. 1 is a plan view, with parts broken away of an embodiment of the invention in a tractor or truck.

Truck is shown as having cab 1, forwardly from which is located internal combustion motor 2 under hood 3. From the motor 2 there extends rearwardly under the truck deck 4 propeller shaft 5 to main or central differential 6. The differential 6 is at rear axle housing 7, which, near the outer edges of the deck 4, has leaf springs 8 that provide yieldable sustaining means for the deck 4. At the driver's station in the cab 1 is steering wheel 9 operable for directing the front pair of wheels 10 in controlling the travel direction for the vehicle. There is also located in the cab 1, brake pedal 11, clutch pedal 12 and gear shift lever 13. Connections from the brake pedal 11 effect the regular service braking at internal brake 14 in the brake drum 15. Emergency brake lever 16 in the cab 1 has connections for applying external brake 17 at the drum 15. The rear axle or housing 7 has therein driving shaft section 18 as actuated by the differential 6. This driving means 18 extends outward beyond the axle housing 7 and is there provided with hub cap 18' connected by bolts 19 with sleeve 20, spaced from the housing 7 by anti-friction bearings 21.

The hub or wheel carrying sleeve 20 has at its inner portion flange 22 upon which is fixedly mounted the brake drum 15. There is accordingly provided in traction wheel mounting, a propelling or power drive. Furthermore, there may be definite retarding, not only by cutting down into the lower speeds of the motor 2, but by service or emergency brake operations.

Adjacent the flange 22, there is rotatably mounted on the primary sleeve or hub 20, inner secondary sleeve or hub 23 having lugs 24 engaged by bolts 25 in assembling web or disk 26 of the inner wheel of the twin or dual set. Bolts 27 in the disk 26 mount lugs 28 in clamping position for locating rim 29 mounting casing 30 having therein inflated inner tube 31 as a pneumatic tire. The secondary hub 23 has teeth forming bevel gear 32 on the hub cap side of this inner wheel.

Keys 33 fixedly assemble against relative rotation ring or spider 34 on the primary hub 20. The ring 34 has transverse openings 35 therethrough in which are located bevel pinions 36 loosely mounted on radially extending pins 37. These pinions 36 are thus located in mesh with the gear 32 of the inner wheel and with gear 38 of outer secondary hub or sleeve 39, loosely mounted on the primary hub 20. The differential 6 has transmission connection as a positive drive through the cap 18'. The power is thus directly connected to rotate the ring 34 with the drive 18 and the hub 20.

The sleeve 39 is provided with lugs 40 engaged by bolts 25 in mounting outer wheel disk or web 41. Bolts 27 through the disk 41 coact with lugs 42 in positively locating rim 29 for the outer pneumatic tire of this dual wheel. In normal travel, any turn of the vehicle operating along a highway, effects departure from identity in route length between the inner and outer wheels of the disks 26, 41, in that the outside wheel in said turning has a longer travel than its companion inside wheel.

Were the wheels anchored to each other, the compensation for the variations in travel would result in slippage under the load, usually considerable in the freight and passenger operations where these heavy duty pneumatic tire wheel pairs are adopted as equipment for distributing the load upon the roadway. In the disclosure herein there are differentials at the wheel pairs. The differentials in the wheels are in addition to the primary differential 6. The differential in the wheel pair is built compactly into a practical, substantial hub, susceptible to readily conform to equipment even in service as to brake drum attachment, driving shaft, anti-friction bearings, rims and tires. In usual vehicle operation, the relative rotation between the primary and secondary hubs is slight, but each tread is always a driving tread for equalized traction effort in holding the vehicle for response to the motor.

Lubricant holding, dust-excluding washer 43, and thrust washer 44, are provided for the main hub antifriction bearings. Nuts 45 hold the hub bearing in place on the axle. Packing 46 between the flange 22 and the secondary sleeve 23, is also lubricant retainer and dust excluding means, as is packing 47 adjacent the nuts 48 mounting the outer sleeves 23, 39, on the inner sleeve 20. Spacer shield 49 about the ring 34 has lubricant retaining packing effectiveness due to its interlocking with the hub 23 at packing containing groove 50 and with the hub 39 at similar groove 51.

Figure 2:
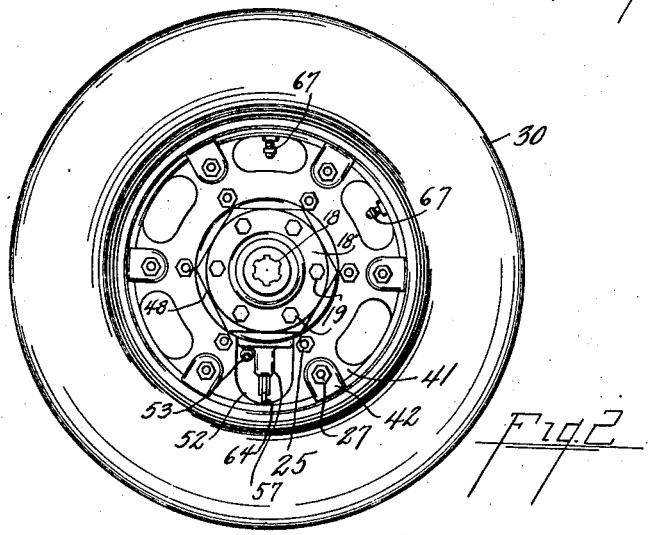
Fig. 2 is a view in elevation of the rear axle end in Fig. 1, as equipped with the twin or dual wheels.
Figure 3:
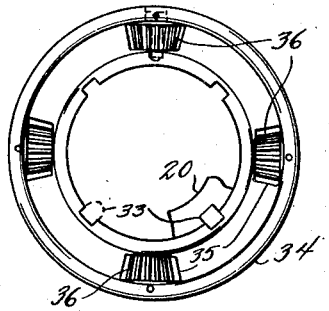
Fig. 3 is a side elevation of the pinion carrying spider of the differential between the pair of wheels.
Figure 4:
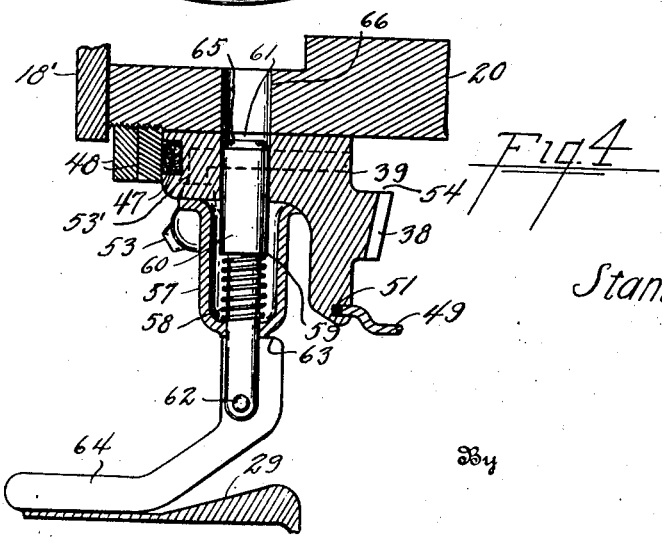
Fig. 4 is a detail view of the cut-out pin for locking the wheel pair as to the differential so that relative rotation may not occur between the wheels.
Figure 5:
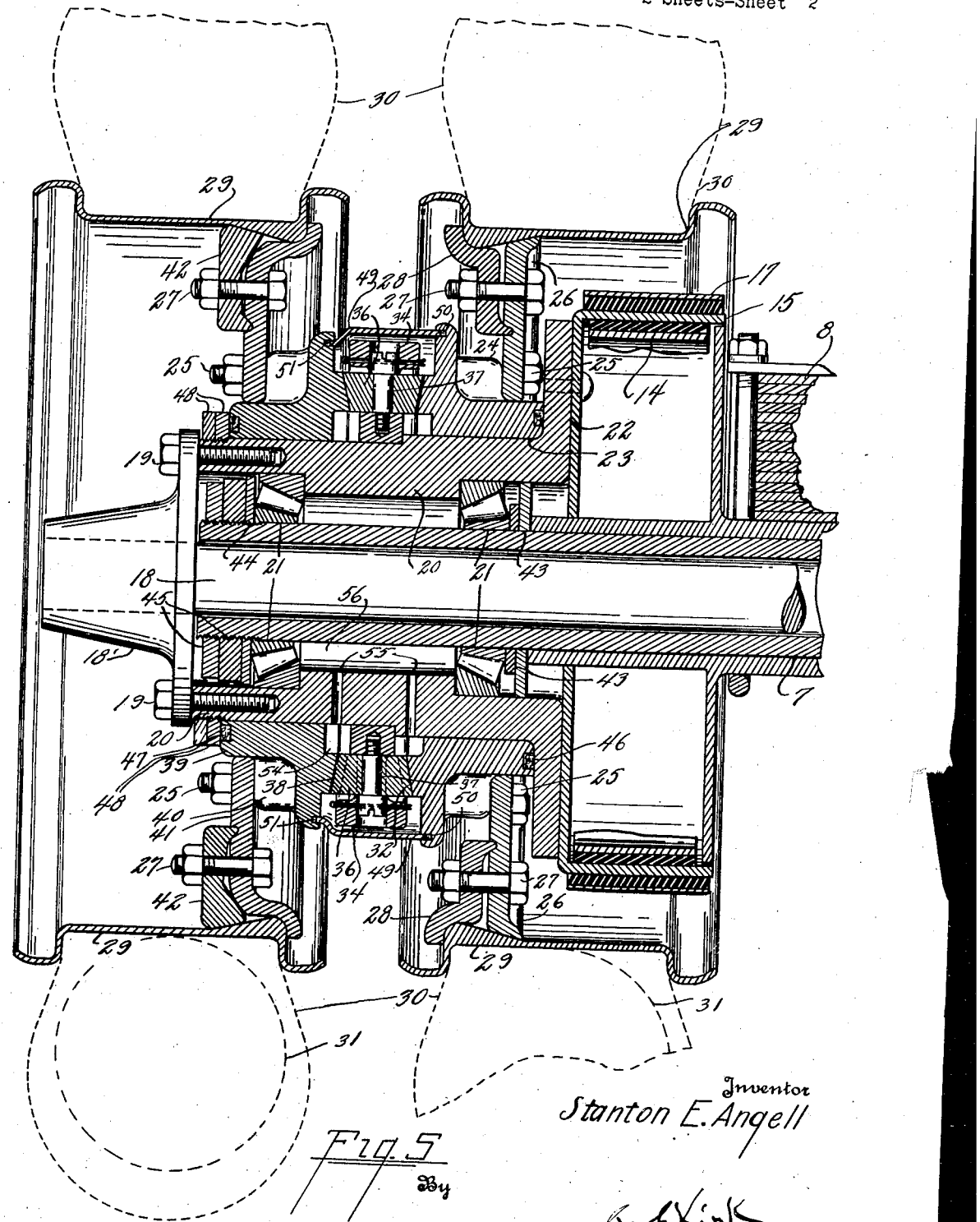
Fig. 5 is a section through the axle carrying the pair of wheels.

The web 41 has clearance opening 52 in which is located pressure lubricant fittings 53 (Figs. 2, 4). Duct 53′ from this fitting extends through the hub 39 into chamber 54 (Fig. 5) about the ring 34. Ducts 55 from this chamber 54 through the sleeve 20 communicate with chamber 56 at the antifriction bearings 21. The single source of lubricant supply is thus effective for the gearing, pinion mountings, sleeve bearings for the secondary hubs, and the hub main bearings.

At the web clearance opening 52 is located shell 57 housing compression helical spring 58 having its thrust action radially inward against shoulder 59 on pin 60 seated in opening 61 in the secondary hub 39. At the outer end of the pin 60 is fulcrum bearing 62 for lever having cam face 63 which when in position against the shell 57 holds the pin 60 retracted to be located only in the hub 39. This lever has arm 64 which when thrown inward away from the rim 29 of the outside wheel of the dual group, shifts the cam face 63 off from the shell 57 and the spring 58 thrusts the pin 60 radially inward to have its bevel terminus 65 ride upon the sleeve 20 until it comes into registry with opening 66 when it snaps thereinto and thus locks the wheel pair to rotate as a unit and against any relative angular movement being permitted by the differential. Occasion for this manipulation may arise when the vehicle is mired, when one of the wheels of the pair is over the edge of a pavement, or for other cause when, upon driving attempt, one of the wheels of the pair may be free to spin. This transformation may be effected simply and quickly. As the emergency therefor is met, the reverse throw of the lever arm 64 again connects the compenstion device between the two pneumatic tire equipped wheels.

Usual pneumatic tire inflation is had at valves 67. In instances of tire trouble, if such be the outer tire of the pair, it is only necessary to remove the lugs 42 to get the rim and its tire off, after jacking up the axle 7. Should the trouble be with the inner tire, the front disk 41 is first removed by taking off the nuts at the bolts 25. With the outer wheel thus removed, the lugs 28 of the inner wheel may be removed to release the inner rim 29 with its tire.

If the wheel pair be adopted merely as traction or ground wheels, with connections for braking, as in trailers, the inter-wheel transmission connection, insures equalization of holding, with multiplied effectiveness in vehicle control in such emergency. In like manner there is braking value in driving wheels to put a drag on the power, or with the power cut out.

What is claimed and it is desired to secure by Letters Patent is:

1. An axle terminus, twin wheels on said terminus, a hub on the axle terminus for the wheels providing a common support for the two wheels as to which support both wheels are rotatable, a brake for the wheel hub, and a gear connection between the wheels including a gear fixed with each wheel, an intermediate member fixed with the hub, and a plurality of pinions mounted on the member and meshing with said gears in permitting positive relative rotation between the wheels, said brake being effective through said hub to hold said member.

2. An axle terminus, twin wheels on said terminus, a hub on the axle terminus for the wheels, each of said wheels being rotatably mounted on the hub and having a gear, pinions meshing with said gears and therebetween, a mounting member for the pinions, said member being fixed with the hub and a drive for rotating the hub relatively to the axle terminus, and a brake for the member as to which member and hub the wheels are relatively positively rotatable.

3. An axle terminus, twin wheels on said terminus, a hub for the wheels upon which each wheel is rotatable relatively to the other, a gear differential between the wheels including a member fixed with the hub, a brake independent of each wheel and connected to the hub, and a drive for the hub for rotating the member relatively to the axle terminus.

4. A hollow axle having a terminus, a sleeve on said terminus, a pair of wheels each rotatably mounted on the sleeve, a differential connection from the sleeve to both wheels, a brake connected to grip the sleeve while leaving the wheels free, and a drive through the axle for rotating the sleeve.

5. An axle terminus, a pair of wheels on said terminus, a sleeve on which both wheels are rotatably mounted, a differential connection between said wheels and mounted on said sleeve, and a brake drum fixed with the sleeve and movable at all times with the sleeve, said wheels being movable relatively to each other and relatively to the sleeve.

6. An axle terminus, a pair of wheels on said terminus, a single hub for the wheels, on which hub each wheel is rotatable, a differential connection between said wheels mounted on the hub, and a shiftable control device effective for anchoring one wheel and the hub for thereby locking both wheels against relative movement.

7. An axle terminus, a pair of wheels on said terminus, a hub for the wheels on which both wheels are rotatable, a differential connection between said wheels mounted on the hub, and a controllable locking pin from one of the wheels to the hub to render the connection effective for holding the wheels against relative movement.

STANTON E. ANGELL.